Aug. 23, 1960     J. R. HEMION ET AL     2,949,778
ELECTRICAL INSTRUMENT
Filed April 1, 1958     3 Sheets-Sheet 1
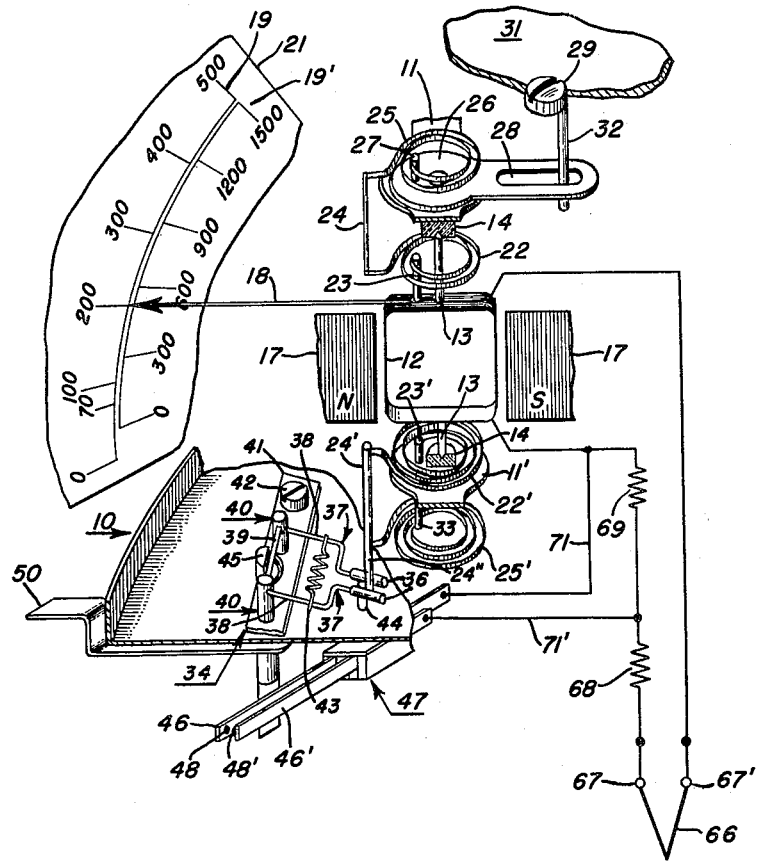
JOHN R. HEMION
PAUL COVALENCE
KENNETH J. RIDDLE
INVENTORS
BY
ATTORNEY

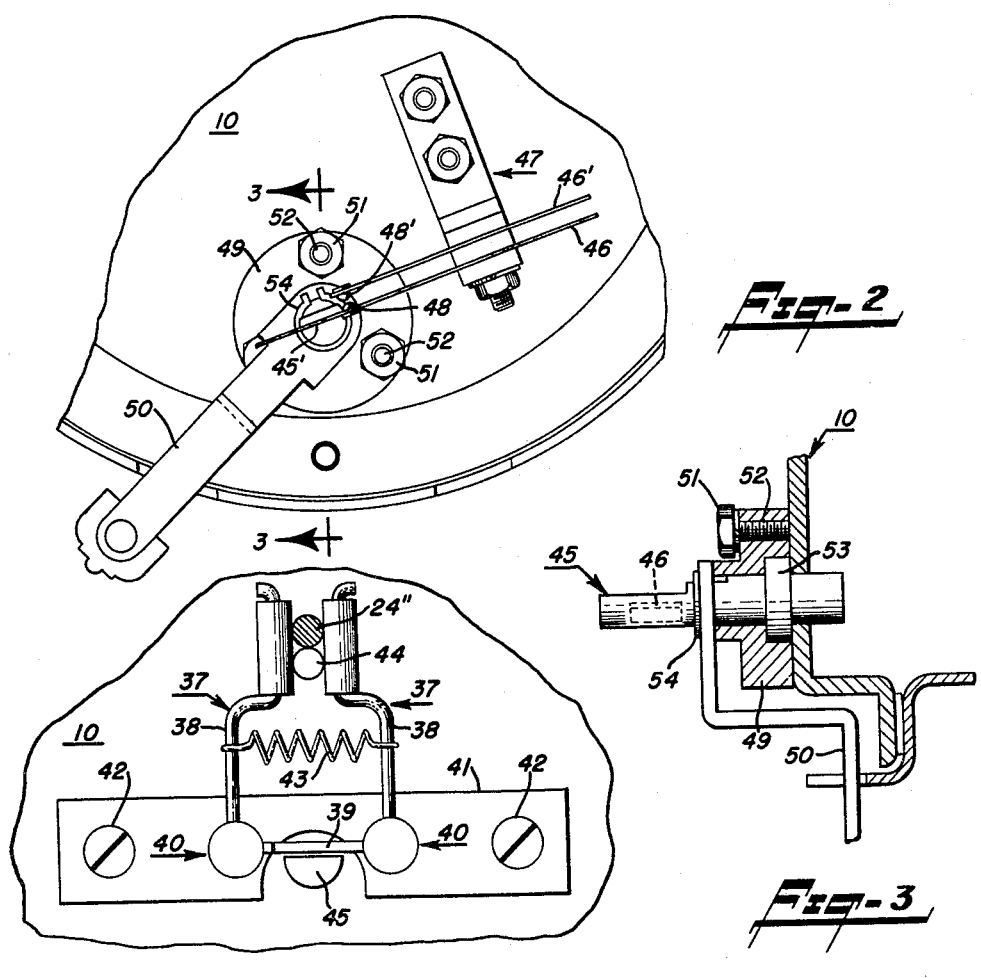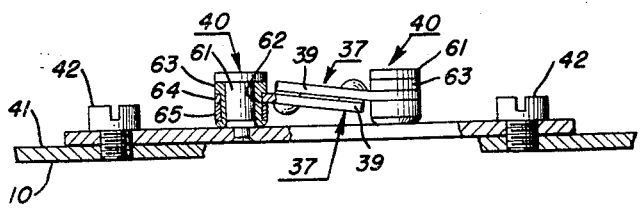

Aug. 23, 1960    J. R. HEMION ET AL    2,949,778
ELECTRICAL INSTRUMENT
Filed April 1, 1958    3 Sheets-Sheet 3
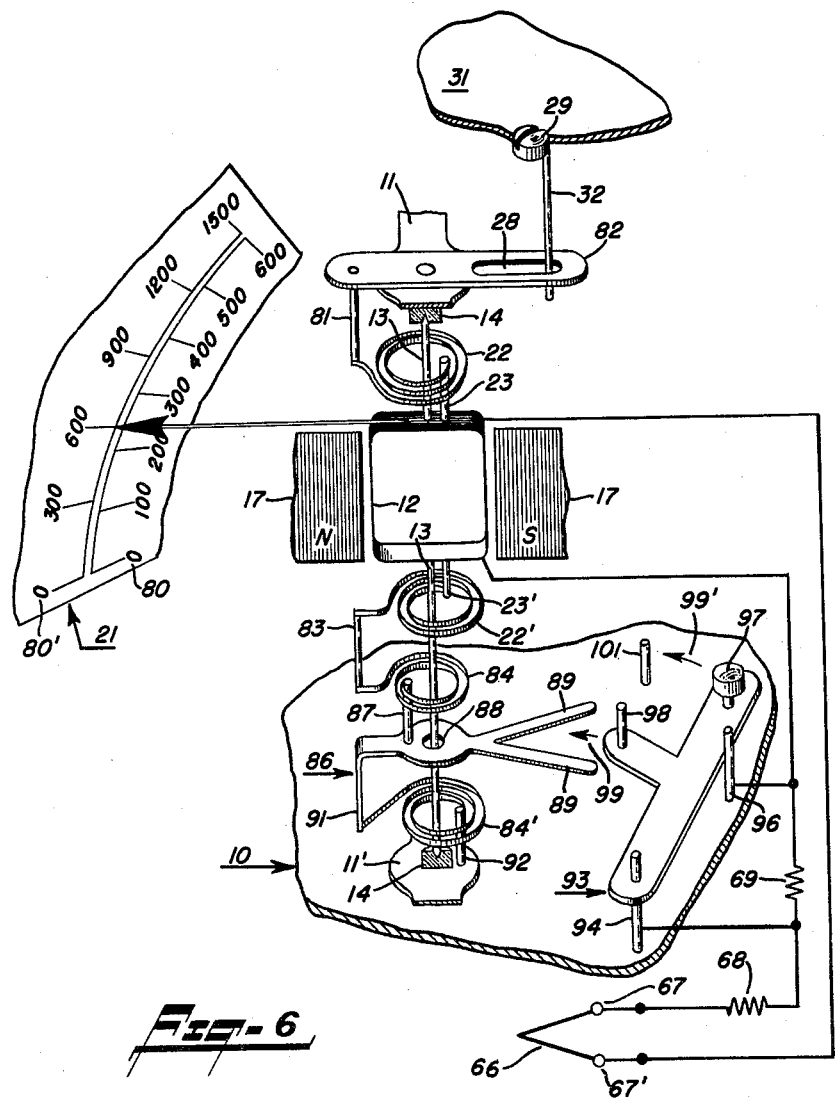
JOHN R. HEMION
PAUL COVALENCE
KENNETH J. RIDDLE
INVENTORS
BY
Rudolph J. Jurick
ATTORNEY United States Patent Office 2,949,778
Patented Aug. 23, 1960

2,949,778

ELECTRICAL INSTRUMENT

John R. Hemion, Summit, Paul Covalence, Mountainside, and Kenneth J. Riddle, Nutley, N.J., assignors to Daystrom, Incorporated, Murray Hill, N.J., a corporation of New Jersey Filed Apr. 1, 1958, Ser. No. 725,645

10 Claims. (Cl. 73—361)

This invention relates to an electrical instrument and more particularly to a temperature compensation arrangement for electrical instruments.

As is well understood, certain electrical measuring instruments provide erroneous indications as a result of changes in the ambient temperature to which they are exposed. One source of error may be introduced by reason of changes in resistance of the instrument windings with changes in temperature. In temperature measuring devices, of the thermocouple pyrometer type, wherein the temperature indicated is the temperature difference between the hot and cold ends of the thermocouple employed therein, it will be apparent that changes in the ambient temperature of the cold end from the temperature at which the thermocouple pyrometer is calibrated, will introduce an additional fixed error in the instrument temperature indication. In order to compensate for such temperature produced errors, prior art instruments, including pyrometers of the thermocouple type, have been provided with temperature responsive deflecting mechanisms, which may include a bimetallic strip, for example, mechanically coupled to the adjustable zero biasing means of the movable element of the instrument. With changes in temperature, the adjustable zero biasing means is moved by action of the bimetallic strip to maintain proper calibration of the instrument. In this manner, automatic cold-end compensation of the thermocouple pyrometer is effected.

A single range thermocouple pyrometer of the type described above may be converted to a double range pyrometer by the addition of a second calibrated scale and of a range resistor in the input circuit thereof. However, with these additions, the instrument deflection for a predetermined change in temperature is different for each of the two temperature ranges and a simple, single, bimetallic strip, as described above, will no longer properly compensate for changes in ambient temperature of the cold-end of the instrument on each range. In prior art, cold-end compensation arrangements for double range pyrometers, attempts have been made to change the effect of the single bimetallic spring on the instrument for each of the ranges through a complex movable lever and arm connecting mechanism between the bimetallic element and the instrument. With such prior art cold-end compensation arrangements for double range thermocouple pyrometers, however, correct compensation throughout the entire range of the instrument is difficult to obtain.

The temperature compensating arrangement of our invention, which is of particular utility in double range thermocouple pyrometer type instruments, includes a pair of temperature responsive deflecting elements of the bimetallic type. On the high range of the instrument, only one of the temperature compensating elements is effective for cold-end compensation, the other element being made inoperative to effect the instrument deflection mechanism by means of a suitable locking, or clamping, mechanism. When the instrument range selector switch is changed to the low instrument range, the other compensating element is unlocked. In the unlocked, or unclamped, position the other compensating element is connected in an aiding mechanical relation with the one temperature compensating element whereby the two compensating elements, together, function to produce the correct cold-end compensation on the low instrument range. By using two temperature compensating devices, one of which is effective on the high range setting and both of which are effective on the low range setting, we provide accurate and dependable cold-end compensation of both the high and low ranges of the double range pyrometer.

An object of this invention is the provision of a simple, reliable, easily adjustable temperature compensating arrangement for a double range electrical instrument.

An object of this invention is the provision of a double range electrical instrument having a novel temperature compensating arrangement, which includes a pair of temperature compensating elements, one of which is effective on one scale range and both of which are effective on another scale range to thereby produce a correct compensating deflection on each instrument range for temperature changes from the ambient temperature at which the instrument is calibrated.

An object of this invention is the provision of a temperature compensating arrangement for cold-end compensation of a thermocouple pyrometer of the double range type, which arrangement includes a pair of temperature responsive deflecting devices, such as coiled bimetallic strips.

An object of this invention is the provision of a double range measuring instrument having a movable element biased to a predetermined position, a pair of temperature responsive deflecting devices mechanically connected to the said movable element, each of the said deflecting devices being operative on one instrument range to actuate the movable element with a change in temperature, and means whereby only one of the said deflecting devices is operative on the other instrument range to actuate the movable element with a change in temperature.

These and other objects and advantages will become apparent from the following description when taken with the accompanying drawings. It will be understood that the drawings are for purposes of illustration and are not to be construed as defining the scope or limits of the invention, reference being had for the latter purposes to the appended claims.

In the drawings wherein like reference characters denote like parts in the several views:

Figure 1 is a fragmentary diagrammatic presentation of one form of electrical instrument embodying our novel temperature compensating arrangement;

Figure 2 is an enlarged fragmentary bottom view of the range changing switch utilized in our novel arrangement;

Figure 3 is a sectional view taken on line 3—3 of Figure 2;

Figure 4 is an enlarged fragmentary top view of the clamping device for one of the temperature responsive devices used in our arrangement;

Figure 5 is a side view, with parts broken away, of the clamping device shown in Figure 4; and Figure 6 is a diagrammatic presentation of a modified form of electrical instrument embodying our invention.

Reference is first made to the diagrammatic presentation of Figure 1 of an electrical instrument embodying our invention and showing a fragmentary portion of a base member 10 forming a portion of the instrument case. Upper and lower instrument bridge members 11 and 11', respectively, may be suitably supported on the base member 10 by means not shown in the drawings. A movable coil 12 is provided with upper and lower pivot staffs 13, 13 which are mounted for rotary movement within jewel pivot bearings 14, 14 which, in turn, are secured to the upper and lower bridge members 11, 11'. The movable coil 12 is supported in a D.-C. magnetic flux field provided by a magnet having pole pieces 17, 17 (only fragmentary portions of the pole pieces being shown) which magnet and attached pole pieces are suitably secured to the base 10 by means not shown in the drawings.

A pointer 18 is secured to the upper staff, or shaft, 13 and cooperates with scales 19 and 19' which are located on a scale plate 21; the two scales 19 and 19' being provided with suitable indicia for the lower and upper temperature ranges, respectively, of the double range instrument. One end of upper and lower spiral control springs 22 and 22' are secured to the movable coil 12 through abutment members 23 and 23', respectively, and are adapted to bias the movable coil to predetermined positions for each scale range. The other end of each of the spiral control springs 22 and 22' are connected, through arm members 24 and 24', to temperature responsive elements, which may comprise, for example, coiled bimetallic strips 25 and 25', respectively. The other end of the upper bimetallic element 25 is attached to an upper abutment 26 through an arm 27 projecting upwardly from the said abutment 26. The upper abutment member 26 is pivotally supported about the axis of the movable coil shaft 13 extended by any suitable means. A projection having an elongated hole 28 therein is formed in the upper abutment. A zero adjusting member 29 is rotatably mounted on the instrument cover designated 31, and is provided with an eccentrically mounted pin 32 which cooperates with the elongated hole 28 in the upper abutment 26. It will be understood that upon rotation of the adjusting member 29, the abutment member 26 may be rotated a predetermined amount for zero correction of the instrument, the upper spiral control spring 22 being moved through the compensating bimetallic element 25 upon rotary movement of the upper abutment 26.

As mentioned above, one end of the lower spiral control spring 22' is secured to the movable coil 12 through an abutment member 23', while the other end thereof is connected through the arm 24' to the lower bimetallic compensating element 25'. The other end of the lower temperature compensating element 25' is connected to the lower bridge member 11' through a lower abutment 33.

It will be understood that the spiral control springs 22 and 22' may be connected to the ends of the winding of the movable coil 12 through the abutment members 23 and 23', respectively, thereby providing means whereby an input signal may be applied to the coil, as will be understood by those skilled in the instrument art. To prevent short circuiting of the movable coil input, the mechanical connections between the spiral control springs 22 and 22' and the abutments 26 and 33, respectively (which connections include the upper and lower temperature responsive devices 25 and 25') are provided with insulating supports, not shown in the drawings.

It will be apparent that the upper bimetallic temperature compensating element 25 is effective to move the arm 24, to which one end of the spiral control spring 22 is attached, with changes in the ambient instrument temperature. For correct temperature compensation on the low range, the lower bimetallic temperature compensating element 25' functions through the connecting arm 24' to move the lower spiral control spring 22' with changes in the ambient temperature. On the high scale range of the instrument, however, the lower temperature compensating element 25' is prevented from effecting the instrument deflections since the upper temperature responsive element 25 alone functions to produce the correct temperature compensation. To this end, we provide a projection 24" which extends downwardly from the arm member 24' which connects the lower spiral control spring 22' to the lower temperature compensating element 25'. A releasable clamping device, designated generally by the reference numeral 34, engages the projection 24" to prevent movement thereof when the instrument is on the high range scale. When the instrument is switched to the low range scale, the clamping, or locking, device 34 is actuated to release the projection 24" whereupon the lower temperature responsive element 25' is free to rotate the lower spiral control spring 22', through the arm 24', with changes in the ambient temperature.

The clamping, or locking, device 34 comprises a pair of spring biased jaw, or clamping, members 36, 36 made of ceramic, plastic, or other suitable insulating material, which engage the projection 24" in the clamped condition thereof. Each of the jaw members 36, 36 are mounted upon one arm of bell-crank mechanisms 37, 37. The bell-crank mechanisms include arm members 38, 38, to which the jaw members 36, 36 are secured, and arm members 39, 39 which extend in a generally parallel, adjacent, position. The arm members 38, 39 of each bell-crank mechanism are pivotally supported upon posts, designated 40, 40, mounted upon a base plate 41 which is secured to the base 10 of the instrument by screw fastening devices 42, 42. A tension spring 43 is connected between the spaced arms 38, 38 of the bell-crank mechanisms and biases the clamping members, or jaws, 36, 36 together into clamping arrangement with the projection 24". A locating pin 44 of insulating material is secured to the base 10 and extends upwardly between the clamping jaws 36, 36. The locating pin 44, is of substantially the same diameter as the projection 24" and assures that the clamping of the projection 24" between the jaws 36, 36 occurs at a predetermined location whenever the clamping device is in clamping relation with the projection 24".

The bell-crank mechanisms 37, 37 of the clamping device 34 are actuated by a rotatably mounted actuating pin 45 which extends through the instrument base 10. The inner end of the generally cylindrical-shaped actuating pin is provided with a flat section, the plane of which is oriented in an adjacent parallel relation with the parallel extending arms 39, 39 of the clamping device in the clamped position thereof. To release the projection 24", the pin 45 is rotated into engagement with the arm members 39, 39 of the bell-crank mechanisms to actuate the same and thereby spread the arm portions 38, 38 apart against the action of the biasing spring 43. The projection 24" is then free to move through action of the lower temperature compensating element 25'.

The lower end of the rotatable actuating pin 45, which extends from the bottom of the base 10, cooperates with the movable contact arm 46 of a switch 47 mounted on the bottom of the base 10. In the position of the rotatable pin 45 shown in Figure 1, the clamping device 34 is in clamping engagement with the projection 24", and the switch is in an open position. Upon rotation of the pin 45 by means of a handle, or lever, 50 attached thereto, the clamping device releases the projection 24" for movement, and the resilient contact arm 46 is actuated in the direction of the stationary contact arm 46' thereby closing the switch contacts 48, 48'.

Details of the clamping device, together with the clamp and switch actuating mechanism, are shown in Figures 2–5 of the drawings. Referring first to Figures 2 and 3, there are shown fragmentary bottom and sectional views, respectively, of the instrument. The pin 45 is rotatably mounted within a hub member 49 secured to the base of the instrument case by nuts 51 engaging threaded posts 52 extending from the base. A radial flange 53 on the pin 45 is positioned in an enlarged portion of the bore in the hub 49. One face of the flange 53 abuts the hub, while the other face thereof abuts the instrument base 10 to thereby limit axial movement of the pin 45. The actuating lever arm 50, for actuation of the clamping device and switch, is attached to the pin 45, adjacent the hub 49 by a locking device 54. The hub in the actuating lever arm 50 through which the pin 45 extends is of the same configuration as the pin cross-section at the place of connection therebetween, whereby relative rotating movement of the lever arm 50 and pin 45 is prevented. In the position of the lever arm 50, shown in Figures 2 and 3, the contact points 48, 48' on the contact arms 46, 46' are in a spaced apart position, and the longer switch contact arm 46 rests against the outer flat portion, designated 45', of the rotatable arm 45. Upon rotation of the lever arm 50 in a counter-clockwise direction, as viewed in Figure 2, the movable contact arm 46 is moved to a position wherein connection is made between the contact points 48, 48', thereby closing the switch.

Reference is now made to Figures 4 and 5 of the drawings wherein top and side views, respectively, of the clamping device 34 for clamping the projection 24" in a predetermined position are shown. As mentioned above, the base plate 41 of the clamping device is mounted on the inside of the instrument base 10 by screws 42. As best seen in Figure 5, the posts 40, 40 for the bell-crank mechanisms 37, 37, comprise pins 61, 61 having rivet-type ends for securing the same to the base plate 41. A bearing sleeve 62 having a radial shoulder 63 is mounted on the pin 61 beneath the head of the pin. The bell-crank arms are integrally formed with a washer member 64 which is rotatably supported on the bearing sleeve 62 between the sleeve shoulder 63 and a cylindrical spacing member 65. The arm portions 39, 39 of the bell-crank mechanisms 37, 37, which are adapted to be engaged by the rotatable pin 45 (shown in Figure 4) are oriented in an adjacent, parallel, relation such that both bell-crank mechanisms are actuated at the same time upon rotation of the pin 45. It will be understood, that as the pin 45 is rotated, it engages the arms 39, 39, pivoting the same about the pins 61, 61 and spreading the arm members 38, 38 against the biasing action of the tension spring 43. The projection 24" is thereby free to move. As mentioned above, the pin 44, which extends from the base 10 of the instrument, assures that the clamping action of the device on the extension member 24" is fixed at the same position whenever the device is in the clamping position shown. Thus, the clamping action on the projection 24" is made to occur at a predetermined fixed location, and does not depend upon the mechanical linkage for actuation of the bell-crank mechanism.

The double range temperature compensated instrument of our invention is particularly adapted for use as a thermocouple pyrometer for temperature measurements. As seen in Figure 1, a thermocouple 66 is positioned at the point that the temperature measurement is to be obtained, and is connected to the instrument terminals 67, 67' through suitable lead wires. The instrument terminal 67 is connected to one end of the low range resistor 68, and the other end of the resistor 68 is connected, through a range changing resistor 69, to one end of the instrument movable coil 12. The other instrument terminal 67' is connected directly to the other end of the movable coil 12. For clarity in the drawing, leads are shown connected directly to the coil; as mentioned above, however, it will be understood that in practice, electrical connection to the movable coil 12 is made through the spiral control springs 22, 22'. The switch contact blades 46, 46' are connected to the opposite ends of the range changing resistor 69 through leads 71, 71'. Obviously, when the switch contacts 48, 48' are closed, upon rotation of the pin 45, a shunt is provided around the range changing resistor 69 which, in effect, removes the same from the circuit. With the switch open, it will be apparent that the instrument terminals 67, 67' are connected, through the two resistors 68 and 69 in series, to the coil 12. With the switch closed, the terminals 67, 67' are connected to the movable coil 12 through the low range resistor 68, only. The flats on the opposite ends of the rotatable actuating pin 45 are relatively oriented such that when the switch actuating flat 45' at the lower end of the pin permits the switch contacts to remain open, the upper flat surface thereof is spaced from the bell crank arms whereby the clamping device 34 is in a closed, or clamped, position to securely position the projection 24". On the other hand, when the rotatable pin is rotated through the lever 50, the switch contacts are closed and the clamping members 36, 36 spread so as to release the projection 24".

Without our novel temperature compensating arrangement, the instrument would indicate the temperature difference between the thermocouple 66 and the instrument terminals 67, 67'. It will be apparent that with such an uncompensated arrangement changes in the cold-end temperature would result in erroneous temperature indications on the scales 19, 19'. In some prior art methods of preventing such temperature errors, the cold end is maintained at a constant predetermined temperature at which the instrument was calibrated. If this was not done, correction tables were necessary in order to determine the correct temperature. With our novel compensating arrangement, we provide automatic means, on both scale ranges, whereby the temperature indication is correct throughout the entire range of the instrument.

In operation, on both instrument ranges, it will be seen that the connecting arm 24, to which the upper spiral control spring 22 is attached, will rotate with changes in the ambient temperature through action of the upper bimetallic element 25. As the ambient temperature increases, the upper bimetallic element 25 functions to rotate the movable coil 12, and attached pointer 18, in a clockwise direction, as viewed in Figure 1.

Considering now the instrument operation on the high range position, as illustrated in Figure 1, wherein the clamping device 34 secures the projection 24" at a predetermined position, and the range-changing resistor 69 is in series circuit connection with the low range resistor 68 in the instrument input, it will be seen that the lower temperature compensating bimetallic element 25' is anchored, or secured, at both ends; the inner end thereof being secured to the lower bridge member 11' through the abutment 33, while the outer end is held by the clamping device 34 through the projection 24". The lower spiral control spring 22' is thereby secured, or anchored, at the outer end thereof through the abutment 24' and projection 24". It will be seen, then, that only the upper bimetallic element 25 functions to produce ambient temperature compensation of the cold-end of the instrument on the high range setting.

When the range changing actuating lever 50 is moved to the low range, the switch contacts 48, 48' are closed and the clamping device 34 opened to release the lower temperature compensating bimetallic element 25'. The range changing resistor 69 is thereby shunted through the switch 47, and the lower temperature compensating bimetallic element 25' is free to rotate the movable coil 12, through the lower spiral control spring 22', with changes in the ambient temperature. Thus, on the low range, it will be understood that the bimetallic elements 25, 25' operate in an aiding manner; both functioning to rotate the movable coil and pointer in a clock-wise direction, as viewed in Figure 1, with an increase in the ambient temperature.

It will be apparent that the novel double range thermocouple pyrometer of our invention may be constructed for operation at any nominal ambient temperature. If the normal ambient temperature is 70 degrees, for example, the instrument is provided with lower and upper scales 19, 19' wherein the 70 degree mark coincides on each of the scales. With this arrangement, the lower bimetallic compensating element 25' positions the projection 24" at the clamping position with an ambient temperature of 70 degrees, wherein the projection location remains stationary whether the clamping device 34 is opened or closed. With a 70 degree ambient temperature, the zero adjusting member 29 is rotated to adjust the pointer to the furnace temperature. By utilizing properly calibrated bimetallic compensating elements in the instrument construction, proper temperature compensation is obtained throughout the entire upper and lower ranges of the double range pyrometer.

It will be understood that our invention is not limited to the particular arrangement of temperature compensating elements, control springs and clamping device shown in Figures 1–5. Another temperature compensating arrangement embodying our invention is shown in the diagrammatic presentation of Figure 6 of the drawings. Referring then to Figure 6, it will be noted that the instrument therein shown includes a base member 10 to which upper and lower instrument bridge members 11 and 11', respectively, may be mounted by means not shown. A movable coil 12, with upper and lower pivot staffs 13, 13 rotatably mounted in jewel bearings 14, 14 secured to the bridge members, is adapted to be rotated in a D.-C. magnetic flux field provided by a magnet having pole pieces 17, 17 (only fragmentary portions of the pole pieces being shown in the drawing). A pointer 18 is secured to the upper staff 13 and cooperates with lower and upper scale markings 80, 80' provided on a scale plate 21. Upper and lower spiral control springs 22, 22' are secured to the movable coil 12 through abutment members 23, 23', respectively. The upper spiral control spring 22 is connected through an arm member 81 to a zero adjusting abutment member 82. The eccentrically positioned pin 32, of the zero adjusting member 29, which is mounted in the instrument cover 31, engages the elongated slot 28 in the abutment member 82 and provides means for zero adjusting the instrument in the usual manner by rotation of the slotted zero adjusting member 29.

The outer end of the lower spiral control spring 22' is connected through an arm member 83 to the outer end of a first bimetallic temperature responsive element 84. The inner end of the bimetallic element 84 is connected to a "floating" fork member 86 through an arm member 87. The lower pivot staff 13 extends through a hole 88 formed in the fork 85, without engagement with the fork. The fork member is provided with a pair of divergent arms 89 and a downwardly extending projection 91. A second bimetallic temperature responsive element 84' is connected between the fork projection 91 and an abutment 92, which abutment 92 is, in turn, secured to the lower bridge member 11'.

A range selector arm 93 is rotatably mounted upon a pin 94 extending upwardly from the instrument base 10. The pin 94, selector arm 93, and a contact pin 96 extending from the base 10 are made of conductive material and comprise a switching arrangement for shunting the range changing resistor 69 in the input circuit of the instrument. A handle 97 of insulating material is fixed to the range selector arm 93 for actuation thereof. The range selector arm 93 not only provides means for shunting the range changing resistor 69 on the low range of the instrument as shown in Figure 6, but also provides means for locking, or clamping, the floating fork member 86 at a predetermined position when the instrument is switched to the high scale range. A pin 98 extending upwardly from the range selector arm 93 is adapted to extend between the divergent arms 89, 89 of the fork 86 on the high range of the instrument, when the selector arm 93 is rotated in the direction of the arrows 99, 99'. A stop member 101 extending from the base 10 limits the selector arm movement in the direction of the arrows 99, 99'.

With the range selector arm 93 in the position shown in Figure 6, the instrument is adapted for measurement on the low range scale 80. The range changing resistor 69 is shunted by the selector arm 93 and the fork member 86 is free to rotate. Thus, it will be seen that cold-end compensation is produced by the additive influence of both of the bimetallic elements 84 and 84'; the two bimetallic elements being connected together through the fork member 86, and to the lower spiral control spring 22' through the connecting arm 83.

For high range scale measurements, the range selector arm 93 is pivoted into abutting engagement with the stop member 101. This places the range changing resistor 69 in series with the low range resistor 68 in the input circuit of the instrument, shown connected to the thermocouple 66. In this position of the range selector arm, the pin 98 on the arm engages the fork member 86 between the divergent arms 89, 89 thereof and locks the fork member 86 at a predetermined position. The lower bimetallic element 84' is thereby prevented from effecting the instrument indication, and only the bimetallic element 84 functions to provide cold end compensation.

Having now described our invention in detail, in accordance with the patent statutes, various other changes and modifications will suggest themselves to those skilled in this art. It is intended that such changes and modifications shall fall within the spirit and scope of the invention as recited in the following claims.

We claim:

1. A measuring instrument comprising a rotatably movable element, a control spring attached adjacent one end thereof to the said rotatably movable element, releasable clamping means positioning the other end of the said control spring at a predetermined position, and a temperature responsive temperature compensating means connected to the other end of said control spring for variably positioning the other end of the control spring with changes in temperature in the released condition of the releasable clamping means.

2. An electrical measuring instrument comprising a rotatably mounted coil, a spiral spring attached adjacent one end thereof to the said coil for biasing the said coil, a releasable positioning device clamping the other end of the said spiral spring at a predetermined position in clamping position, and a bimetallic temperature responsive device connected to the other end of the spiral spring for variably positioning the other end of the said spiral spring with changes in temperature when the said releasable clamping device is in the unclamped condition.

3. A measuring instrument comprising a rotatably supported movable element, first and second spiral control springs attached adjacent one end thereof to the said movable element, first and second temperature responsive temperature compensating elements attached adjacent one end to the other ends of the said spiral control springs, means positioning the other ends of the said temperature responsive temperature compensating elements at predetermined positions, and releasable clamping means positioning the other end of the said first spiral control spring at a predetermined position in the clamped condition of the releasable clamping means.

4. The invention as recited in claim 3 including a zero correction adjusting element secured to the other end of the said second temperature responsive temperature compensating element for variably positioning the other end of the second temperature responsive temperature compensating element.

5. A measuring instrument comprising a rotatably movable element, a control spring attached adjacent one end thereof to the said rotatably movable element, a temperature responsive temperature compensating element, a connecting arm connecting the other end of the said control spring to one end of the said temperature compensating element, a releasable clamping device comprising a pair of bell-crank mechanisms having a pair of jaws biased together into clamping engagement with the said connecting arm, means including a rotatable actuating pin having a flat section adjacent one end thereof for pivoting the said bell-crank mechanism to release the said connecting arms, the said temperature compensating element variably positioning the other end of the said control spring with changes in temperature when the said connecting arm is in an unclamped condition.

6. The invention as recited in claim 5 including a switch which is actuated by the said rotatable actuating arm upon rotation of the said actuating pin during actuation of the said bell-crank mechanisms of the releasable clamping device.

7. A measuring instrument comprising a rotatably supported movable element, first and second spiral control springs attached adjacent one end thereof to the said movable element, means positioning the other end of the said first spiral control spring at a predetermined position, first and second temperature responsive temperature compensating elements, means connecting one end of the said first temperature compensating element to the other end of the said second spiral control spring, a connecting member connecting the other end of the said first temperature compensating element to the one end of the said second temperature compensating element, means positioning the other end of the said second temperature compensating element at a predetermined position, the said first and second temperature compensating elements rotating the other end of the said second spiral control spring in one direction when the said connecting member is free to rotate, and releasable locking means locking the said connecting means at a predetermined position, the said connecting means being rotatably movable in the unlocked position of the said locking means.

8. The invention as recited in claim 7 wherein the said connecting member includes a pair of divergent arms extending therefrom and the said releasable locking means comprises a pin movable into and out of engagement with the divergent arms of the said connecting member.

9. A measuring instrument comprising a rotatably moavble element, a control spring attached adjacent one end thereof to the said movable element, releasable clamping means clamping the other end of the said control spring at a predetermined position, a temperature responsive temperature compensating means, and means connecting the said temperature responsive temperature compensating means to the said other end of the control spring for variably positioning the other end of the control spring with changes in temperature of the said temperature compensating means in the released condition of the releasable clamping means.

10. An electrical instrument comprising a rotatably movable element, a control spring attached adjacent one end thereof to the said rotatably movable element, a temperature responsive temperature compensating element connected at one end thereof to the other end of the said control spring for variably positioning the said other end of the control spring with changes in temperature of the said temperature compensating element, and releasable clamping means positioning the said other end of the control spring at a predetermined position, the said temperature compensating element being inoperative to move the said other end of the control spring when the said releasable clamping means is in clamping position.

References Cited in the file of this patent

UNITED STATES PATENTS 1,639,365     Brown _____ Aug. 16, 1927

FOREIGN PATENTS 178,860     Germany _____ Oct. 22, 1906